June 26, 1956 D. J. D. PUGSLEY 2,752,424

SYNCHRONISING ARRANGEMENT PARTICULARLY FOR TELEVISION APPARATUS

Filed Jan. 21, 1953 5 Sheets-Sheet 1

INVENTOR

BY Donald J. D. Pugsley

Holcombe Wetherill & Brisebois
ATTORNEY

June 26, 1956 D. J. D. PUGSLEY 2,752,424

SYNCHRONISING ARRANGEMENT PARTICULARLY FOR TELEVISION APPARATUS

Filed Jan. 21, 1953 5 Sheets-Sheet 2

INVENTOR

BY Donald J. D. Pugsley

Holcombe Wetherill & Brisebois

ATTORNEY

INVENTOR
Donald J. D. Pugsley
BY
Holcombe Wetherill & Brisebois
ATTORNEY

INVENTOR
Donald J. D. Pugsley
BY
Holcombe Wetherill & Brisebois
ATTORNEY

INVENTOR
Donald J. D. Pugsley
BY
Holcombe Wetherill & Brisebois
ATTORNEY

United States Patent Office 2,752,424

Patented June 26, 1956

2,752,424

SYNCHRONISING ARRANGEMENT, PARTICULARLY FOR TELEVISION APPARATUS

Donald J. D. Pugsley, Cambridge, England, assignor to Pye Limited, Cambridge, England, a British company Application January 21, 1953, Serial No. 332,275

Claims priority, application Great Britain January 23, 1952

14 Claims. (Cl. 178—69.5)

Figure 1:
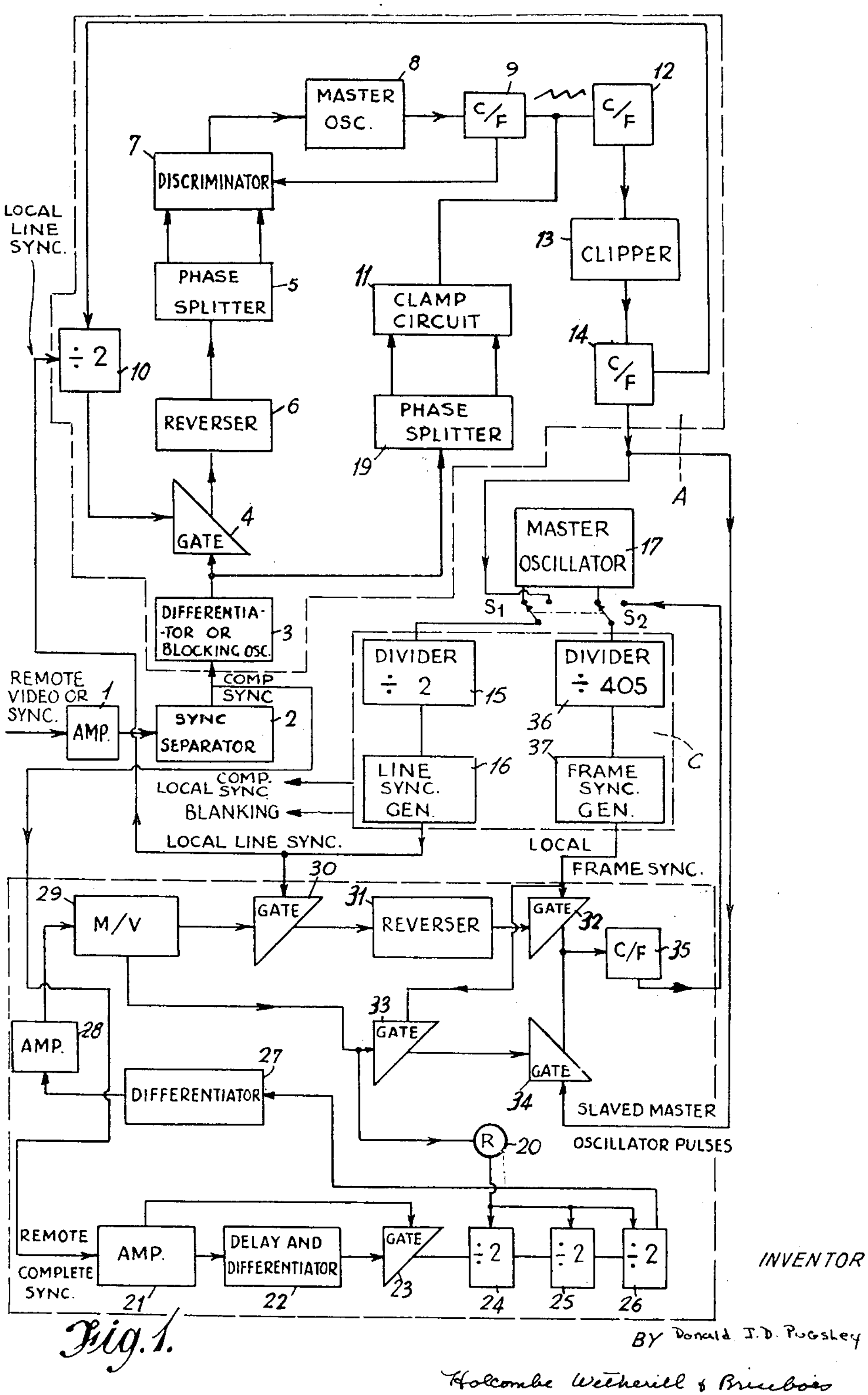

The present invention relates to a synchronising arrangement, particularly for television apparatus, for causing an oscillator to run in step with incoming synchronising pulses. The arrangement is particularly suitable for locking a television waveform to be radiated from a television transmitting station (hereinafter called the "local station") in step with the waveform received from a remote camera having its own waveform generator, for example a camera in a remote studio or used for an outside broadcast. At the present time if a part of a programme is being produced at the local station, for example at the Alexandra Palace studios, and another part of the programme is being produced at a remote studio, for example at the Lime Grove studios, it is necessary to completely cut out the video signal for a short interval when changing over from one studio to the other in order to bring the radiated waveform into step with the incoming waveform from the remote studio, whereafter the video signal is reinserted in the transmitted waveform. The present invention provides a synchronising arrangement which enables the changeover from one studio to another to be effected more easily and which even enables fading to be effected between the parts of the programme produced in the local and the remote studios.

According to one feature of the invention, the incoming remote line synchronising pulses, or locally produced pulses derived from and tied to the incoming remote line synchronising pulses, (hereinafter called the controlling pulses) are applied to a discriminator circuit where they are compared with the low slope edge of a sawtooth derived from a master oscillator at the local station whose frequency is in turn controlled by the D. C. potential derived from the discriminator. This D. C. potential is derived in such a way that the sawtooth locks in frequency with the incoming controlling pulses. The output from this local controlled master oscillator, which is then tied to the controlling pulses, is fed to the delay line and divider in the local transmitter waveform generator to produce the synchronising waveform to be transmitted and the synchronising and blanking waveforms for controlling the local cameras.

In order to avoid the necessity of operating the apparatus at the local station which controls the controlled master oscillator when transmissions are only to be made from local cameras, a second uncontrolled master oscillator may be provided at the local station, a switch being provided to connect the waveform generator either to the master oscillator controlled by the incoming controlling pulses when pictures from the remote camera are to be transmitted or to the uncontrolled local master oscillator when only locally produced picture signals are to be transmitted.

The controlled master oscillator, like the uncontrolled master oscillator, normally runs at twice the line frequency and in order that the incoming controlling pulses should "work upon those alternate sawteeth (hereinafter called "line" sawteeth) derived from the controlled master oscillator which will eventually produce the local line synchronising pulses in the waveform generator, a feature of the invention consists in feeding the incoming controlling pulses to the discriminator through a gate stage which is controlled by pulses locked to the local line synchronising pulses in such a manner that the controlling pulses can only pass through the gate during the period of a "line" sawtooth. If a controlling pulse occurs during a "blank" sawtooth (that is a sawtooth intermediate the "line" sawteeth), the controlling pulse does not pass the gate and the frequency of the controlled master oscillator is allowed to drift until it is correctly phased with the controlling pulses.

The present invention also provides an arrangement for phasing the frame synchronising pulses produced by the synchronising waveform or pulse generator at the local station with the frame synchronising pulses of the synchronising waveform coming from a remote camera or studio.

From another aspect therefore the invention also consists in a synchronising arrangement, particularly for television apparatus, for phasing the frame synchronising pulses produced by a generator of a waveform comprising line and frame synchronising pulses with the frame synchronising pulses of a controlling similar waveform, wherein the frame synchronising pulses are produced in the waveform generator by feeding input pulses at line frequency or a multiple thereof to a divider comprising an electronic digital counter which produces an output frame pulse after a predetermined number of input pulses, and wherein means are provided which operate in dependence upon the phase relationship of the generated frame pulses and the controlling frame pulses to advance or retard the count of the divider until correct phasing is achieved. This feature of the invention may be carried into effect by causing lack of phasing between the two series of frame pulses either to inject additional correcting pulses into the divider or to suppress the pulses fed thereto or the effect thereof, whereby when the controlling frame pulses are in advance of the generated frame pulses additional correcting pulses will be fed to the divider to advance its count, whilst when the controlling frame pulses are phase-retarded on the generated frame pulses, the effective pulses fed to the divider will be reduced to retard the count.

The line slaving circuit causes the controlled master oscillator to synchronise with the incoming remote line synchronising pulses, and the frame phasing circuit phases the local frame pulses produced by the local synchronising pulse generator with the incoming remote frame synchronising pulses. Thus the locally produced waveform, which is used both for the radiated waveform and for the local cameras, is in complete synchronism and phase with the remote waveform, and it becomes possible to switch or fade between local to remote cameras in the same way as switching and fading is at present possible between cameras in the same studio.

Figure 2:
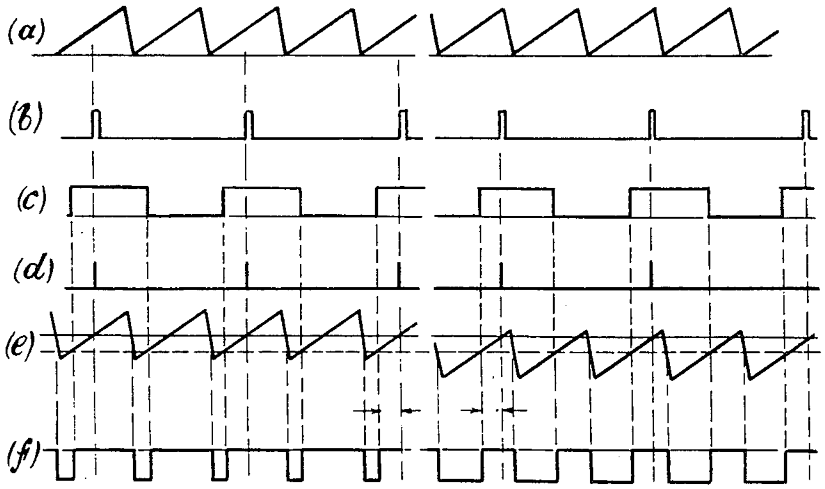
Figure 3:
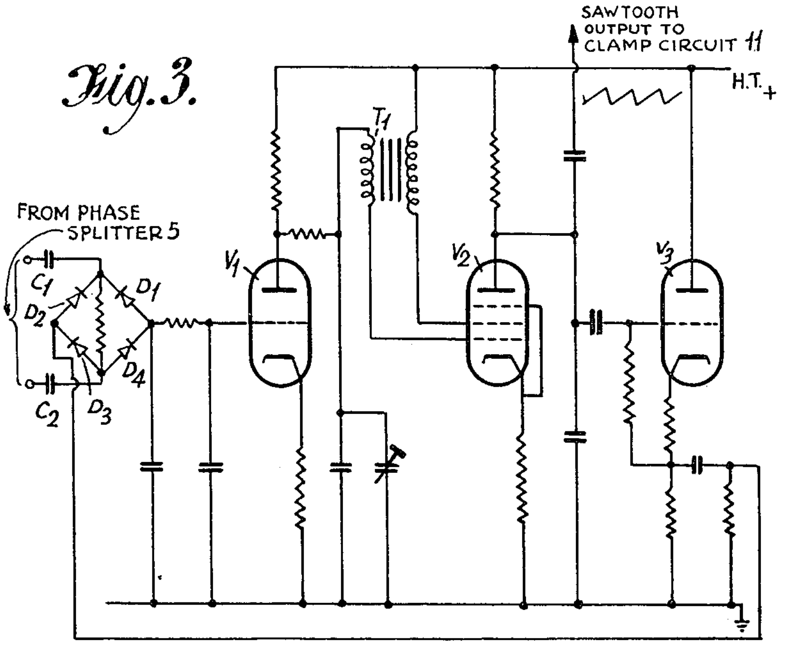
Figure 4:
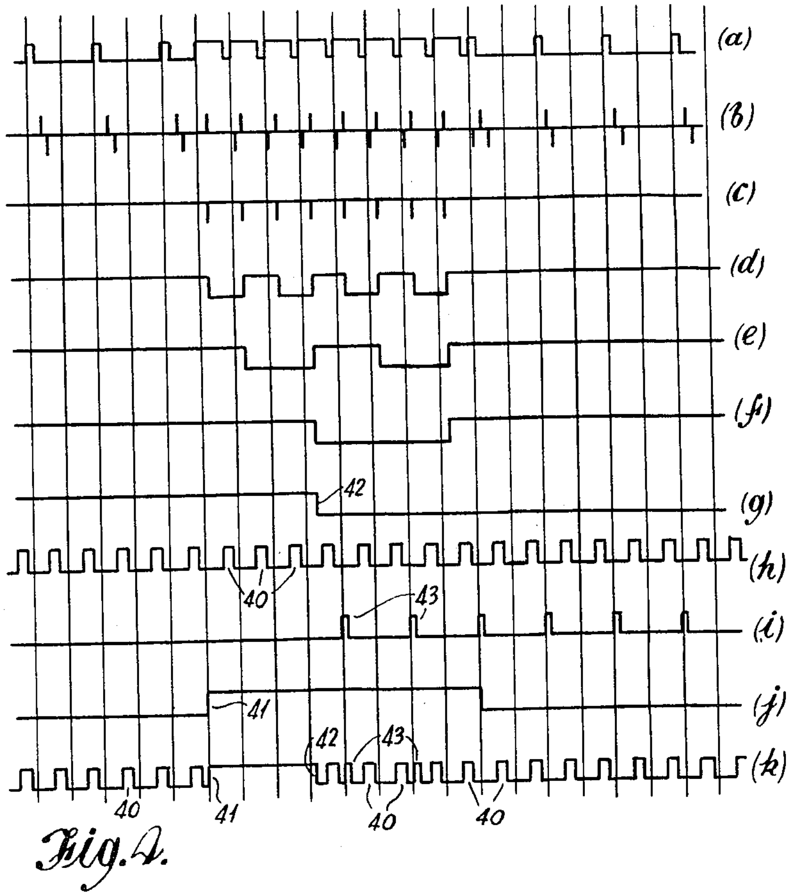
Figure 6:
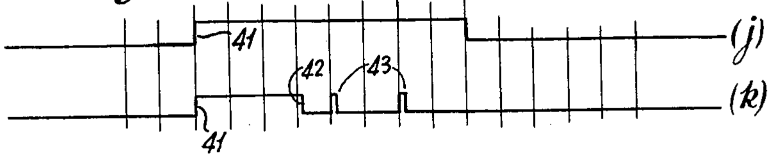
Figure 5:
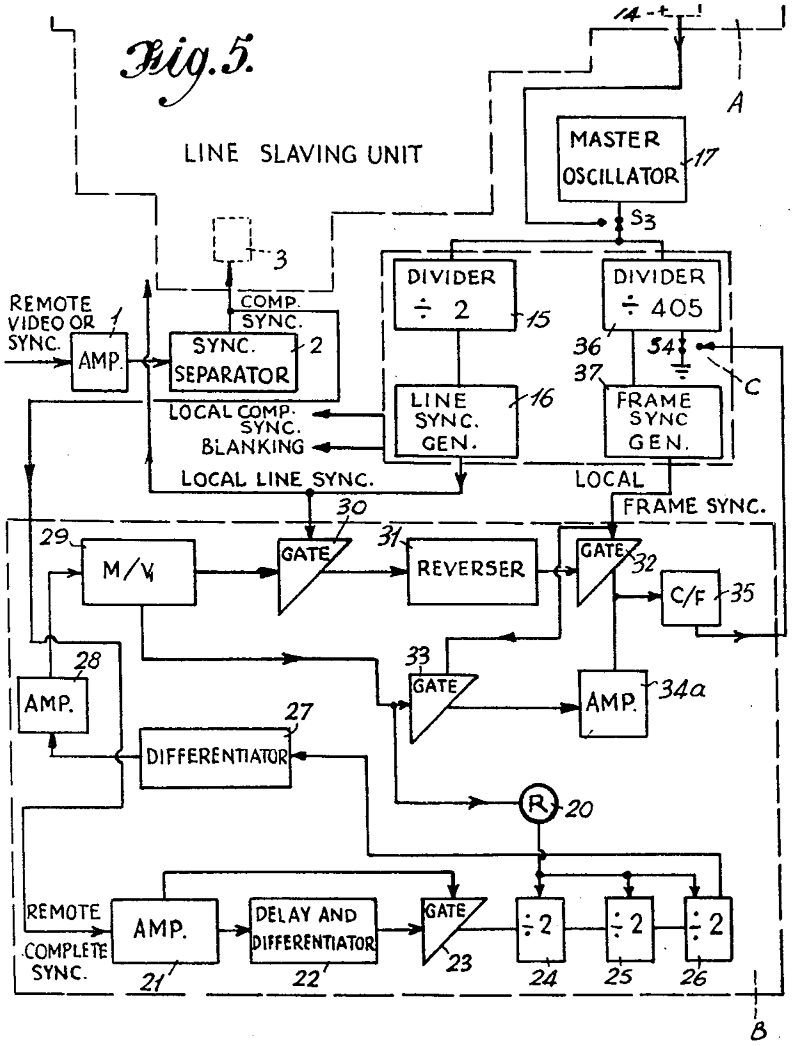
Figure 7:
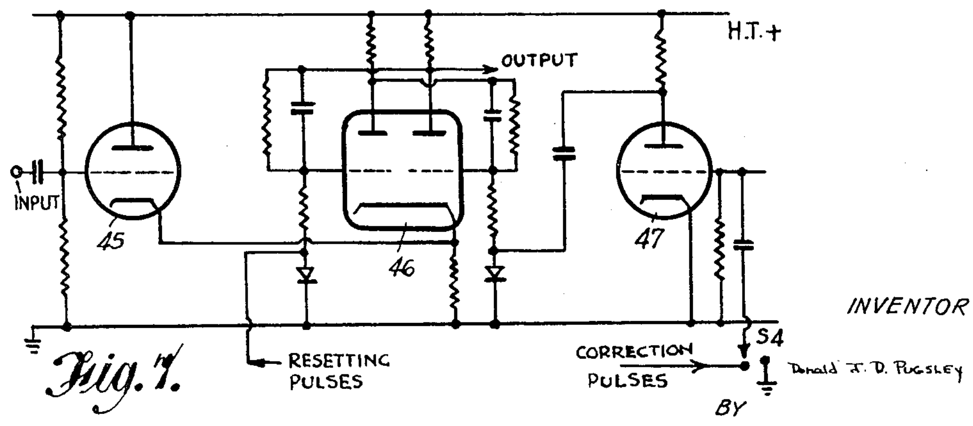
Figure 8:
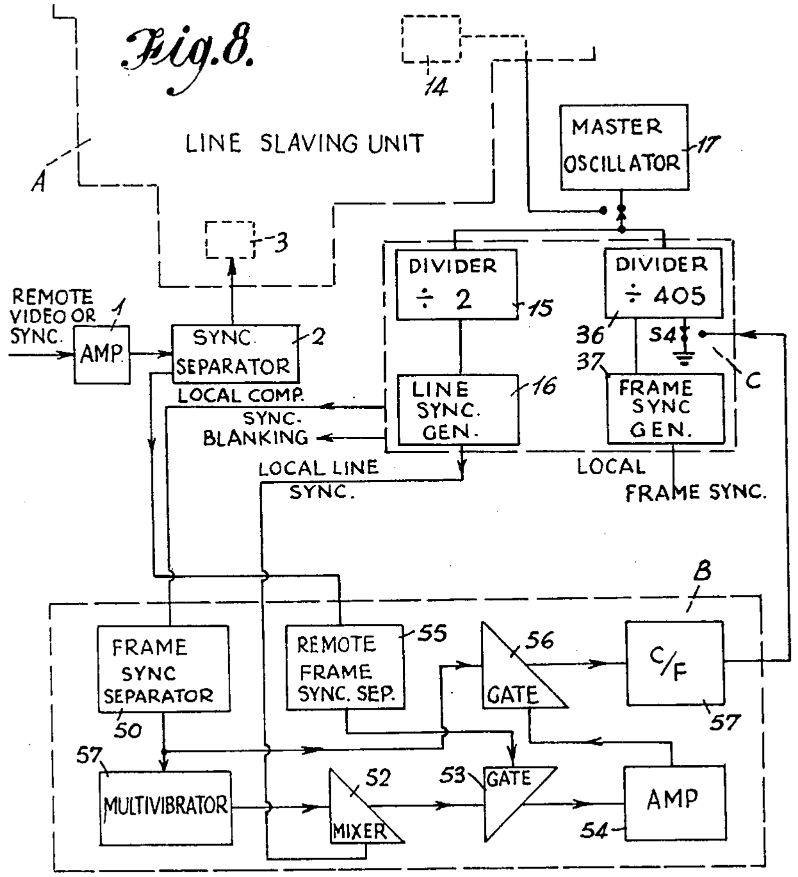
Figure 10:
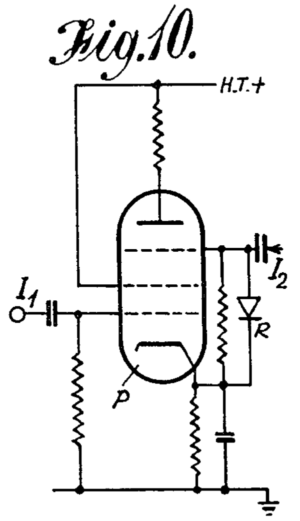
Figure 9:
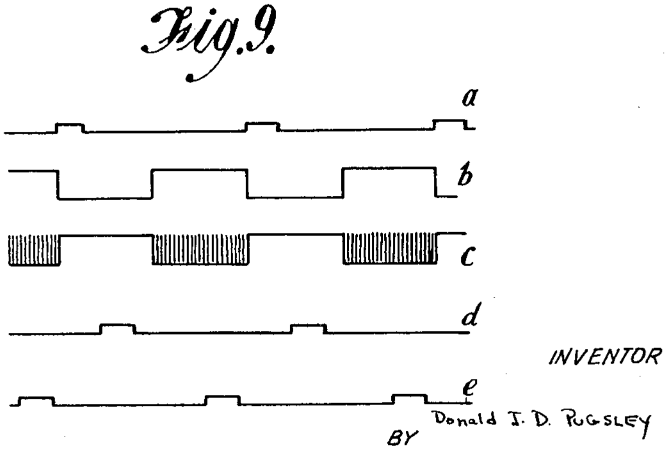

In order that the invention may be more fully understood, various embodiments thereof as applied to the British television standards will now be described with reference to the accompanying drawings, in which:

Fig. 1 is a block diagram of one circuit arrangement according to the invention including a line slaving circuit and a frame phasing circuit, Fig. 2 shows waveforms for explaining the operation of the line slaving circuit in Fig. 1, Fig. 3 is a circuit diagram of the frequency control circuit for the master oscillator of the line slaving circuit of Fig. 1, Fig. 4 shows waveforms explaining the operation of the frame phasing circuit of Fig. 1, Fig. 5 is a block diagram of a modified circuit arrangement according to the invention, Fig. 6 shows waveforms explaining the operation of the frame phasing circuit shown in Fig. 5, Fig. 7 shows a portion of the frame frequency divider circuit of Fig. 6, Fig. 8 is a block diagram of a further modified circuit arrangement according to the invention, Fig. 9 shows waveforms explaining the operation of the frame phasing circuit of Fig. 8, Fig. 10 is a circuit diagram of one form of gate circuit.

Referring to Fig. 1, the incoming remote complete video waveform is after suitable amplification in the amplifier 1, fed through a synchronising separator 2, the separated synchronising waveform being fed both to the line slaving circuit shown enclosed in the dotted rectangle A and to the frame phasing circuit shown in the dotted rectangle B.

Referring first to the operation of the line slaving circuit A, the leading edges of the line synchronising pulses are used to trigger a blocking oscillator or differentiated in the device 3 to produce large amplitude controlling pulses of which the timing is tied to the incoming line synchronising pulses. These large amplitude controlling pulses are then applied to a gate circuit 4 and, when passed by the gate, are applied to a phase splitter 5 via a reverser 6. The phase splitter pulses are applied to a discriminator circuit 7 where they are compared with the low slope edges of a reference sawtooth waveform derived from the master oscillator 8 of which the frequency is in turn controlled by the D. C. potential derived by the discriminator 7. The reference sawtooth waveform fed to the discriminator 7 is derived from the cathode follower stage 9 fed by the output from the master oscillator 8. The controlling D. C. potential derived from the discriminator is such that the frequency of the sawtooth waveform locks in frequency to the incoming controlling pulses, the master oscillator, however, running at twice the line frequency.

In order that the controlling pulses will "work" upon those alternate "line" sawteeth which will eventually produce the local line synchronising pulses in the waveform generator (or synchronising pulse generator), a waveform of 50/50 mark space ratio (that is a square waveform of which the pulse signals and intervening spaces are of equal time duration), which is produced by a simple division by 2 in the bistable multivibrator 10 of the twice line frequency applied to the synchronising pulse generator, is fed back to control the gate 4. This waveform is controlled by the local line synchronising pulses in such a manner that the gate will pass the controlling pulses only during the "line" sawteeth. This is shown in Figure 2, where the sawtooth output of the master oscillator is shown in curve *a*, and in which the local line synchronising pulse illustrated in curve *b* controls the waveform shown in curve *c* fed to the gate 4 so that the gate will be open only during the "line" sawteeth. Thus if the controlling pulses (curve *d*) arrive during the "line" sawteeth, they will be passed through the gate 4 to the phase splitter 6 and control the frequency of the master oscillator. If, however, the controlling pulses arrive during the "blank" sawteeth, they do not pass the gate 4 and the frequency of the master oscillator 8 is allowed to drift until it is correctly phased with the controlling pulses.

A positive "locked" sawtooth waveform derived in the above described manner is passed to a clamp circuit 11 and clamped to a pre-set D. C. potential into the grid of a cathode follower 12. The clamp pulses derived from the clamp circuit 11, are produced from the output waveform of the device 3, fed through a phase splitter 19. The output of this cathode follower 12 is D. C. fed to the first grid of a cathode coupled multivibrator clipper 13. Therefore by altering the D. C. level to which the clamp is working (Fig. 2*e*), the point of clipping of the sawtooth is altered. The pre-set clipped edge may thus be set in any position relative to the incoming synchronising pulses which determine the phase of the clamp pulses.

Should the frequency of the remote synchronising pulses vary (as shown at the right hand side of Fig. 2), the controlling pulses for both the discriminator 7 and the clamp circuit 11 will both ride along their respective sawtooth waveforms. The discriminator 7 provides different bias for the master oscillator 8 in order that its frequency will lock to that of the incoming synchronising pulses. The clamp sawtooth will phase itself in relation to the incoming synchronising pulses, but the clamp pulses will still clamp the new phased sawtooth to the same D. C. potential at the instant of clamping; therefore the clipped output pulses (Fig. 2*f*) will still bear the same time relationship to the incoming synchronising pulses provided that the sawtooth is linear. Thus the line synchronising pulses of the local synchronising pulse generator, which is shown enclosed in the dotted rectangle C are tied in frequency and phase to the incoming remote synchronising pulses.

The slaved output pulses at the master oscillator frequency from the clipper 13 are fed via the cathode follower 14 to the switch S1 which can connect the line slaving circuit to the divide-by-2 divider 15 and the line pulse generator 16 in the synchronising pulse generator C1 in place of the uncontrolled pulses from the master oscillator 17 which normally feeds the synchronising pulse generator for solely local studio transmissions, the connection being such that the positive edge from the clipper will be duly fed to initiate the synchronising edges.

One particular arrangement of the frequency controlling circuit 7, 8, 9 for the master oscillator 8 is shown in Figure 3. The controlling pulses fed from the phase splitter 5 are applied respectively through condensers C1 and C2 to opposite ends of a bridge circuit 44 comprising four rectifiers D1, D2, D3, D4 which forms the discriminator 7. The D. C. output from the bridge circuit is fed through a filter network to the input of the amplifier valve V1 comprising a triode valve the output from which is fed to the pentode V2 of the master oscillator 8. This pentode has its control grid and screen connected in conjunction with transformer T1, as a blocking oscillator and producing a sawtooth output waveform at its anode. The sawtooth output from the valve V2 of the master oscillator 8 is fed through the triode V3 of the cathode follower 9, the output of which is fed back to the discriminator 7 and compared with the incoming control pulses from the phase splitter 5 to vary the D. C. potential controlling the oscillator.

The sawtooth output from the oscillator V2 is also fed to the clamp circuit 11 and clamped to a pre-set D. C. potential into the grid of the cathode follower 12.

The remote complete synchronising waveform comprising both line and frame synchronising pulses, derived from the synchronising separator 2 is also fed to the frame phasing circuit, shown enclosed in the dotted rectangle B. This waveform, as shown in Fig. 4*a* is, after amplification in the amplifier 21, delayed and differentiated in the device 22, the differentiated pulses (Fig. 4*b*) if necessary after clipping to remove the negative peaks, being fed to a gating circuit 23 controlled by the undelayed incoming complete synchronising waveform. The arrangement is such that only the differentiated pulses derived from the leading edges of the delayed frame pulses will thus pass the gate 23, the output from which is shown by the waveform 4*c*. These pulses are then fed to the three binary counters 24, 25 and 26 the output waveforms from which are shown respectively in Figs. 4*d*, 4*e*, 4*f*. It will thus be seen that the output waveform from the counter 26 comprises a pulse which begins a short time after the commencement of the fourth frame pulse and ends the same time after the beginning of the eighth or last frame pulse. The leading edge of this output pulse shown in Fig. 4*f* can easily be positioned to any desired time delay after a frame synchronising pulse and in the embodiment described is conveniently at a time interval of 15 micro-seconds after the beginning of the fourth frame pulse.

The leading edge of the output pulse from counter 26 is differentiated in the circuit 27 and after amplification in the amplifier 28 is applied to trigger a monostable multivibrator 29 which is adjusted to give an approximately 50–50 pulse of each phase, that is so that when the multivibrator 29 is triggered by a pulse from the amplifier 28 it will not restore to its stable state until after approximately a half frame period. This waveform is shown in Fig. 4*g*, and the pulse 42 which is initiated by the triggering pulse from the amplifier 28 is herein referred to as the switching pulse. The trailing edge of this switching pulse 42 lies approximately midway between two successive groups of incoming frame synchronising pulses, and is applied through the resetting valve 20, to reset the counters 24, 25 and 26 in such a way that the edge used to trigger the multivibrator 29 is reliably phased. The resetting circuit preferably operates in the manner described in the specification of copending application No. 276,983.

An output is taken from the multivibrator 29 and fed to the gate circuit 30 to which the locally produced line synchronising pulses from the generator C are also fed. The gate 30 is controlled by the output from the multivibrator 29 such that the gate is opened by the switching pulse triggered by the counter 26 and is closed when the multivibrator restores to its stable state and feeds the resetting pulse to the counters 24, 25 and 26. The local line synchronising pulses 43 are thus passed by the gate 30 during this interval as indicated in Fig. 4*i*. These pulses are reversed in the reverser 31 and fed to the gate circuit 32 which is controlled by the locally produced frame synchronising pedestal fed from the generator C and indicated in Fig. 4*j*. Thus the number of local line synchronising pulses 43 passed by the gate 32 will depend upon the time interval between the instant at which the line pulses begin to be passed by the gate 30 and the instant at which the gate 32 is closed by the trailing edge of the local frame synchronising pedestal. The output from the gate 32 will thus lie between four local line synchronising pulses if the leading edge of the frame synchronising pedestal occurs simultaneously with or subsequent to the leading edge of the switching pulse, and no output pulses if the frame synchronising pedestal occurs entirely in advance of the switching pulse. When the leading edge of the switching pulse 42 occurs between the leading and trailing edges of the frame synchronising pedestal, the number of local line synchronising pulses passed by the gate 32 will be some number less than four.

The output waveform (Fig. 4*g*) from the multivibrator 29 and the local frame synchronising pedestal are also applied to a third gate circuit 33 with such polarities that the frame synchronising pedestal will be passed only during that portion of the frame interval when no line synchronising pulses are being passed by the gate 30. Thus the frame synchronising pedestal, or a portion thereof, is passed during this interval to the gating circuit 34 to which are also applied the locally generated slaved master oscillator pulses (Fig. 4*h*), at twice line frequency, from the cathode follower 14 of the line synchronising circuit. The gate 34 closes when the frame synchronising pedestal, or a part thereof, is applied to the gate, thereby to suppress the slaved master oscillator pulses during this period.

The gating circuits 32 and 34 have common anode loads such that their outputs are mixed together and fed through the cathode follower 35 and the switch S2, to the frame frequency divider 36 of the local synchronising pulse generator C, the divider 36 feeding the local frame synchronising pedestal generator 37.

If the frame synchronising pedestal derived from the generator 37 is synchronised with the incoming frame synchronising pulses, the waveform passed by the gates 32 and 34 will be as shown in Fig. 4*k*. Twice line frequency slaved master oscillator pulses 40 will pass through the gate 34 until the leading edge 41 of the local frame synchronising pedestal occurs when the gate 34 will be closed. It remains closed until opened by the switching pluses 42 from the multivibrator 29, whereafter the twice line frequency master oscillator pulses 40 are again fed through the gate 34. After the occurrence of the switching pulse 42, provided that this occurs during the local frame pedestal 41, the gate 32 is also opened which allows the local line synchronising pulses 43 to pass until the gate 32 is closed by the trailing edge of the frame synchronising pedestal. As will be clearly apparent from Figs. 4*i* and 4*j*, two local line synchronising pulses 43 will be passed during this interval and injected into the waveform fed to the divider 36 as shown in Fig. 4*k*. Thus the total number of pulses fed to the divider 36 during the period of the frame synchronising pedestal is equal to the number of master oscillator pulses which would normally have been applied to the divider during this same interval, namely 8, and the local waveform generator continues to operate without change.

However, if the local frame synchronising pedestal occurs after the first one of the incoming frame synchronising pulses, less master oscillator pulses will be gated out and more local line pulses will be gated into the waveform fed to the divider 36, which will advance the count to the next frame synchronising pedestal derived from the divider, thereby phasing the local frame synchronising pedestal towards the incoming frame synchronising pulses. On the other hand, if the local frame synchronising pedestal occurs in advance of the first incoming frame synchronising pulse, more master oscillator pulses at twice line frequency will be gated out of the waveform supplied to the divider 36 by the gate 44, and possibly less local line pulses will be gated in, thereby retarding the count and again phasing the local frame synchronising pedestal with the remote frame synchronising pulses. A state of equilibrium exists when, as shown in Fig. 4*k*, the number of pulses gated out equals the number of pulses gated in, in which state synchronism is achieved.

The master oscillator pulses are, as shown in Fig. 4*h*, delayed on the incoming line synchronsising pulses, and the locally produced line synchronising pulses are further delayed on the master oscillator pulses so that the local line synchronising pulses will synchronise with the incoming line synchronising pulses. The delay intervals introduced are such that the local line pulses will be separate from and not overlap the master oscillator pulses so that the master oscillator pulses and local line pulses fed to the divider will be separately counted.

One particular form of the synchronising pulse generator C is described in the specification of co-pending application No. 276,918.

Figure 5 shows a block diagram of a circuit arrangement similar to that of Figure 1, but in which the frame phasing circuit only applies correcting pulses to the frame frequency divider in the local synchronising pulse generator, the twice line frequency master pulses being applied to the frame frequency divider from the cathode follower stage 14 of the line slaving circuit A. This line slaving circuit A is the same as that described with reference to Figure 1, and is not therefore shown in detail. The frame phasing circuit now employed is shown enclosed in the dotted rectangle B and the local synchronising pulse generator now employed is shown in the dotted rectangle C.

Referring to the frame phasing circuit, this is very similar to that shown in Fig. 1, but it will be seen that in place of the gate circuit 34 previously employed an amplifier 34a is now used which is fed from the gate circuit 33 and feeds the cathode follower stage 35. It will also be noticed that the slaved master oscillator pulses from the cathode follower 14 of the line synchronising unit are now only fed to the switch S3, and not to the frame phasing unit. When this switch S3 is changed from its local control position, in which it is connected to the master oscillator 17, to the remote control position in which it is connected to the output from the cathode follower 14, the slaved master oscillator pulses are fed to both the divided-by-2 divider 15 feeding the line sync generator 16 and the divide-by-405 divider 36 feeding the frame sync generator 37. When the switch S3 is in the remote control position, the switch S4 connected to the divider 36 is also switched so that the output from the cathode follower 35 is fed into the resetting line of the divider to inject correcting pulses to this divider.

The output of the cathode follower 35 will now be as shown in Figure 6*k* when the local frame pedestal generator is in phase with the incoming frame synchronising pulses. This waveform 6*k* is shown with reference to the local frame pedestal in Figure 6*j* which corresponds to the waveform of Figure 4*j*. The remaining waveforms *a* to *i* of Figure 4 also apply to the arrangement now being described.

The correction pulses are applied to a re-setting line operating on the first binary unit of the chain of binary dividers comprising the divider unit 36, which is preferably constructed as described in copending application No. 276,983. The action of this part of the circuit will be described hereafter with reference to Figure 7.

If the local frame synchronizing pedestal occurs after the first one of the remote frame synchronising pulses, the pulse 48 defined by the instants 41 and 42 will be of shorter duration and hence less master oscillator pulses will be stopped from triggering the first stage of the divider 36, and more local line synchronising pulses will be applied to the first stage of the divider 36 which will effectively advance the count towards the next frame synchronising pedestal derived from the divider, thereby phasing the local frame synchronising pedestal towards the incoming frame synchronising pulses. On the other hand, if the local frame synchronising pedestal occurs in advance of the first incoming frame pulse, more master oscillator pulses at twice line frequency will be stopped from triggering the first stage of the divider 36 due to the increased duration of the pulse 48 and possibly less local line pulses will be fed in thereby retarding the count and again phasing the local frame synchronising pedestal with the remote frame synchronising pulses.

Figure 7 shows a circuit diagram of the first binary unit of the divider 36, which comprises a plurality of binary counting devices constructed, for example, as described in the aforementioned copending application No. 276,983. The master oscillator pulses either from the local master oscillator 17, or the slaved pulses from the cathode follower 14, are applied to the input grid of a cathode follower buffer valve 45 and from the cathode output of this stage to the cathode of the first binary unit 46. This binary unit comprises two triode valves of which the anodes are respectively cross-connected with the grid of the opposite valve, the output pulses being derived from the anode of one of the valves and fed to the next binary unit of the divider chain. The grid of the left-hand triode of the unit 46, as viewed in Figure 7, is connected to earth through a rectifier, such that the rectifier normally presents a low impedance path to the grid current, and resetting pulses applied from subsequent stages of the divider chain to give the desired count, are applied to the junction between the grid resistor and the rectifier, the latter presenting a high impedance to the re-setting pulses which are of negative polarity.

The correction pulses from the cathode follower 35 are applied to the grid of a triode amplifier 47 and from thence to the grid of the right-hand triode of the binary unit 46 at the junction between the grid resistor and one electrode of a rectifier having its other electrode connected to earth. This rectifier is also connected with such polarity that it normally presents a low impedance to grid current but presents a high impedance to the correction pulses which are applied on to the grid with negative polarity. The arrangement is such that correction pulses such as 48, will retard the count whilst the line frequency pulses 43 will advance the count of the divider.

Figure 8 shows a further circuit arrangement according to the invention comprising a line synchronising circuit represented by the block A which is the same as that described with reference to Fig. 1 and a frame phase circuit which is shown enclosed in the dotted rectangle B. These two circuits control the local synchronising pulse generator C which is similar to that described with reference to Fig. 5.

In this embodiment, the frame phasing circuit B comprises a frame synchronising separator 50 in which a series of pulses each of a duration embracing the local frame synchronising pedestal are derived from the local complete synchronising waveform. These pulses which are shown in Fig. 9*a* are fed to a multi-vibrator 51, and produce pulses as shown in Fig. 9*b* each of which have a duration of half the frame period, and the multivibrator then returning to its normal condition for the other half of the frame period. The waveform from multi-vibrator 51 is applied to a mixer stage 52 where it is combined with local line synchronising pulses derived from the local line pulse generator 16 to produce the waveform shown in Fig. 9*c*, in which it can be seen that line pulses are inserted in the pulse train produced by the multivibrator 51 for one half of each frame period. The line pulses shown in Fig. 9*c* are only given as an indication and are in no way intended accurately to represent the number of such pulses which would actually be present. The output from the mixer 52 is applied to a gate 53 which can only produce an output during remote frame pedestal pulses which are of equal duration to the local frame pulse, but will generally be of different phase. These remote frame pedestal pulses are derived from the synchronising separator 2 through the frame synchronising separator circuit 55 and are fed to the gate 53. Thus, if the remote frame pedestal were phased as shown in Fig. 9*d* relative to the local frame pedestal (Fig. 9*a*), then an output of the same phase and duration as the waveform of Fig. 9*d* will be obtained from the gate 53. This pulse is then amplified and inverted in the amplifier 54 and fed to the gate 56 where an output is produced which is of opposite polarity but of equal duration to the input pulses from amplifier 54. The gate 56 is only closed during the local frame pedestal pulses. The output from the gate 56, is fed through the cathode follower 57, and applied as a correcting pulse or pulses to the first binary unit of the divider 36, when the switch S4 is in the remote control position, to reset the first binary unit as described with reference to Fig. 7.

Thus if a pulse such as in Fig. 9*d* having a duration equal to a frame period is fed as a correcting pulse to the divider 36 a miscount is produced which effectively increases the frame interval duration by the duration of the remote frame period and causes the local frame pedestal to phase itself by the duration of the remote frame pedestal towards the latter.

Similarly when the remote frame pedestal is phased as in Fig. 9*e* during the part of the waveform of Fig. 9*c* which incorporates the line pulses, these local line pulses are gated through the gate 53 during the remote frame pedestal interval 9*e*, and are fed through the amplifier 54, gate 56 and cathode follower 57 as correction pulses to the divider 36 where they effectively cause the divider to miscount by a number equal to the number of line trigger pulses fed to the divider. The count of the divider 36 is thus effectively reduced and the local frame pedestal moves towards the phase of the remote frame pulses.

Thus after a few frame intervals correct phasing will have been attained.

When the two frame periods are in phase, the pulse passed by the amplifier 54 to the gate 56 is gated out by the local frame pedestal Fig. 9*a* applied to the gate 56, and thus no correction pulse is fed to the divider 36 and the frame phase relationship between the local synchronising pulse generator and the remote frame synchronising pulses is maintained.

According to a modification of the embodiment described with reference to Fig. 8, instead of using the local frame pedestal to drive the multi-vibrator 51 and close gate 56, the remote frame period is used for these purposes and the local frame pedestal is used, instead of the remote frame period, to close the gate 53. This modification necessitates the pulses fed from the multi-vibrator 51 to the mixer 52 being of opposite polarity to those obtained with the arrangement shown in Fig. 8.

Figure 10 shows one form of gating circuit which can be used for the gate devices in the various circuit arrangements hereinbefore described. This gating circuit comprises a pentode valve P having a short grid base. A rectifier R is connected between the suppressor grid and cathode to prevent the suppressor grid from going positive with respect to the cathode. The gate is of the coincidence type and only passes anode current when positive signals are applied simultaneously to the control grid and to the suppressor grid of the valve. When a positive input signal is applied from $I_1$ to the control grid but no positive signal is present on the suppressor grid, current passes through the screen grid circuit of the valve but not through the anode circuit. When a positive input signal is applied from $I_2$ to the suppressor grid and no signal is applied to the control grid, the latter will effectively bias the valve to cut-off by reason of the automatic cathode bias circuit.

Anode current passes through the valve, and hence a voltage drop is produced across the anode load resistor, only when the signals applied to the control grid and suppressor grid are coincident.

Whilst particular embodiments have been described, it will be understood that various modifications may be made without departing from the scope of the invention.

I claim:

1. A synchronising arrangement, particularly for television apparatus, for locking the frame synchronising pulses produced by a generator of a waveform comprising line and frame synchronising pulses in step with the frame synchronising pulses of an incoming similar waveform, comprising a master oscillator, means for feeding the master oscillator pulses to a divider in the waveform generator through a gating device, means for producing the local frame pulses from the output of said divider, means for closing the gating device by the leading edge of the locally produced frame synhcronising pedestal, means for opening the gating device by the trailing edge of said frame synchronising pedestal, means for producing a switching pulse at a predetermined time interval after the beginning of the incoming frame pulses, means for applying said switching pulse to said gating device so as to open the gate if said switching pulse occurs before the trailing edge of the local frame synchronising pedestal, a second gating device, means for opening said second gating device by said switching pulse, if it occurs during the period of the local frame synchronising pedestal, means for closing said second gating device by the trailing edge of said frame synchronising pedestal, said second gating device, when open, injecting auxiliary pulses into the divider, the arrangement being such that when the local frame synchronising pedestal is in synchronism with the incoming frame synchronising pulses the number of auxiliary pulses injected compensates for the master oscillator pulses which have been gated out, whilst when the local frame synchronising pedestal is out of synchronism with the incoming frame synchronising pulses the total number of pulses fed to the divider during the period of the local frame synchronising pedestal is increased or decreased to advance or retard the count in the divider until the local frame synchronising pedestal is brought into synchronism with the incoming synchronising pulses.

2. A synchronising arrangement particularly for television apparatus, for phasing the line synchronising pulses produced by the synchronising pulse generator at a local station with the line synchronising pulses of a controlling similar waveform, comprising means for producing controlling line synchronising pulses, a master oscillator at the local station, means for producing a sawtooth waveform from the output of said master oscillator, a discriminator circuit, a gate circuit, means for controlling said gate circuit by pulses locked to said local line synchronising pulses, means for feeding the controlling line synchronising pulses to the discriminator circuit through said gate circuit, means for feeding the sawtooth waveform to said discriminator circuit, so that said controlling pulses are compared with the low-slope edge of said sawtooth waveform, means for deriving a D. C. potential from the discriminator circuit varying in value in accordance with the phase relationship between said controlling pulses and said sawtooth waveform, means for feeding the D. C. potential from said discriminator to control the frequency of the master oscillator, and means for feeding the output from the master oscillator to the synchronising pulse generator at the local station.

3. Arrangement as claimed in claim 2, in which the gate circuit is controlled by a waveform of 50/50 mark space ratio locked to said local synchronising pulses.

4. A synchronising arrangement particularly for television apparatus, for phasing the line synchronising pulses produced by the synchronising pulse generator at a local station with the line synchronising pulses of a controlling similar waveform, comprising means for producing controlling line synchronising pulses, a master oscillator at the local station, means for producing a sawtooth waveform from the output of said master oscillator, a discriminator circuit, means for feeding the controlling line synchronising pulses and the sawtooth waveform to the discriminator circuit so that said controlling pulses are compared with the low-slope edge of said sawtooth waveform, means for deriving a D. C. potential from the discriminator circuit varying in value in accordance with the phase relationship between said controlling pulse and said sawtooth waveform, means for feeding the D. C. potential from said discriminator to control the frequency of the master oscillator, means for feeding the output from the master oscillator to the synchronising pulse generator at the local station, a second uncontrolled master oscillator at said local station, and switch means for switching betwen said controlled master oscillator and said second uncontrolled master oscillator.

5. A synchronising arrangement particularly for television apparatus, for phasing the line synchronising pulses produced by the synchronising pulse generator at a local station with the line synchronising pulses of a controlling similar waveform, comprising means for producing controlling line synchronising pulses, a master oscillator at the local station, means for producing a sawtooth waveform from the output of said master oscillator, a discriminator circuit, means for feeding the controlling line synchronising pulses and the sawtooth waveform to the discriminator circuit so that said controlling pulses are compared with the low slope edge of said sawtooth waveform, means for deriving a D. C. potential from the discriminator circuit varying in value in accordance with the phase relationship between said controlling pulses and said sawtooth waveform, means for feeding the D. C. potential from said discriminator to control the frequency of the master oscillator, means for feeding the ouput from the master oscillator to a clamp circuit, means for controlling said damp circuit by said controlling pulses, means for feeding said clamped sawtooth waveform to a clipper circuit and means for controlling the local synchronising pulse generator with the output from said clipper circuit.

6. A synchronising arrangement particularly for television apparatus, for phasing the line synchronising pulses produced by the synchronising pulse generator at a local station with the line synchronising pulses of a controlling similar waveform, comprising means for producing controlling line synchronising pulses, a master oscillator at the local station, means for producing a sawtooth waveform from the output of said master oscillator, a discriminator circuit, a gate circuit, means for controlling the gate circuit by pulses locked to said local line synchronising pulses, means for feeding the controlling line synchronising pulses to the discriminator circuit through said gate circuit, means for feeding the sawtooth waveform to said discriminator circuit so that said controlling pulses are compared with the low slope edge of said sawtooth waveform, means for deriving a D. C. potential from the discriminator circuit varying in value in accordance with the phase relationship between said controlling pulses and said sawtooth waveform, means for feeding the D. C. potential from said discriminator to control the frequency of the master oscillator, means for feeding the output from the master oscillator to a clamp circuit, means for controlling said clamp circuit by said controlling pulses, means for feeding said clamped sawtooth waveform to a clipper circuit and means for controlling the local synchronising pulse generator with the output from said clipper circuit.

7. Apparatus for synchronising a train of pulses produced in a pulse generator with a train of controlling pulses, comprising means for producing a sawtooth waveform from the pulse generator, a discriminator circuit, a gate circuit controlled by pulses from said pulse generator, means for feeding the controlling pulses through said gate circuit, to said discriminator circuit, means for feeding the sawtooth waveform to said discriminator circuit so that said controlling pulses are compared with the low-slope edge of said sawtooth waveform, means for producing a D. C. voltage from said discriminator circuit varying in dependence upon the relationship between said sawtooth waveform and said controlling pulses, and means for feeding said D. C. potential to control said pulse generator.

8. A circuit arrangement for phasing output pulses from a pulse generator with a train of controlling pulses, comprising means for producing a sawtooth waveform, a discriminator circuit, means for feeding the controlling pulses and said tooth waveform to said discriminator circuit, means for producing a D. C. potential in said discriminator circuit varying in accordance with the relationship between said controlling pulses and said sawtooth waveform, means for applying said D. C. potential to control the frequency of said pulse generator, a clamp circuit, means for applying the controlling pulse to said clamp circuit, means for applying the controlling pulse to said clamp circuit, means for feeding the output of said clamp circuit to clamp the sawtooth waveform, a clipper circuit, means for feeding the clamped sawtooth waveform to the clipper circuit and means for deriving pulses from said clipper circuit to control said pulse generator and having a delay which varies from the controlling pulses with frequency variation, but in which the difference between the time interval between successive controlling pulses and said delay time remains constant with frequency variation.

9. A circuit arrangement for phasing output pulses from a pulse generator with a train of controlling pulses, comprising means for producing a sawtooth waveform, a discriminator circuit, means for feeding the controlling pulses and said sawtooth waveform to said discriminator circuit, means for producing a D. C. potential in said discriminator circuit varying in accordance with the relationship between said controlling pulses and said sawtooth waveform, means for applying said D. C. potential to control the frequency of said sawtooth waveform generator, a clamp circuit, means for applying the controlling pulse to said clamp circuit, means for feeding the output of said clamp circuit to clamp the sawtooth waveform to a D. C. potential, a clipper circuit, means for feeding the clamped sawtooth waveform to the clipper circuit and means for deriving output pulses from said clipper circuit to control the pulse generator, said latter output pulses being delayed on the controlling pulses by an amount which changes with variation in frequency but in which the time difference between an output pulse and the next succeeding controlling pulse remains constant with variation in frequency.

10. Apparatus as claimed in claim 9, in which said sawtooth waveform is produced by a master oscillator whose frequency is controlled by the D. C. output of said discriminator.

11. A synchronising arrangement particularly for television apparatus for phasing the frame synchronising pulses produced by a local synchronising pulse generator with frame synchronising pulses of a controlling waveform, comprising a divider circuit comprising an electronic digital counter, means for feeding input pulses at line frequency to said divider circuit, means for producing output pulses at frame frequency from said divider circuit after a predetermined number of input pulses, and control means operated in dependence upon the phase relationship of the output frame pulses from the divided circuit and the controlling frame pulses to advance or retard the count of the divider until correct phasing is achieved, said control means comprising means for injecting additional correcting pulses into the divider to advance its count when the controlling frame pulses are phase-advanced on the generated frame pulses, and means for suppressing the pulses normally fed to said divider when the controlling frame pulses are phase retarded on the generated frame pulses whereby the number of pulses fed to the divider will be reduced to retard its count.

12. A synchronising arrangement as claimed in claim 11, in which the additional pulses are injected into the train of pulses feeding the divider between said input pulses when it is desired to advance the count, and a pulse of a duration covering at least two successive input pulses is injected into said train of pulses to suppress said input pulses for the duration of said latter injected pulse when it is desired to retard the count.

13. A synchronising arrangement, particularly for television apparatus, for phasing the frame synchronising pulses produced by a local synchronising pulse generator with frame synchronising pulses of a controlling waveform, comprising a divider circuit, comprising an electronic digital counter, means for feeding input pulses at a multiple of line frequency to said divider circuit, means for producing output pulses at frame frequency from said divider circuit after a predetermined number of input pulses, and control means operated in dependence upon the phase relationship of the output frame pulses from said divider circuit and the controlling frame pulses to alter the count of the divider until correct phasing is achieved, said control means comprising means for injecting additional correcting pulses into the divider to advance its count when the controlling frame pulses are phase-advanced on the generated frame pulses, and means for suppressing the pulses normally fed to said divider when the controlling frame pulses are phase retarded on the generated frame pulses whereby the number of pulses fed to the divider will be reduced to retard its count.

14. A synchronising arrangement as claimed in claim 13, in which the additional pulses are injected into the train of pulses feeding the divider between said input pulses when it is desired to advance the count, and a pulse of a duration covering at least two successive input pulses is injected into said train of pulses to suppress said input pulses for the duration of said latter injected pulse when it is desired to retard the count.

References Cited in the file of this patent

UNITED STATES PATENTS

| | | |
|---|---|---|
| 2,515,613 | Schoenfeld | July 18, 1950 |
| 2,523,556 | Burrell | Sept. 26, 1950 |
| 2,556,933 | Mulligan | June 12, 1951 |
| 2,570,775 | De Baun | Oct. 9, 1951 |
| 2,597,743 | Millspaugh | May 20, 1952 |
| 2,655,556 | Abelson | Oct. 13, 1953 |